US010075835B2

(12) United States Patent
Vembar et al.

(10) Patent No.: US 10,075,835 B2
(45) Date of Patent: Sep. 11, 2018

(54) AD-HOC WIRELESS COMMUNICATION NETWORK INCLUDING WEARABLE INPUT/OUTPUT TRANSDUCERS

(71) Applicant: INTEL CORPORATION, Santa Clara, CA (US)

(72) Inventors: Deepak S. Vembar, Portland, OR (US); Lenitra M. Durham, Beaverton, OR (US); Glen J. Anderson, Beaverton, OR (US); Cory J. Booth, Beaverton, OR (US); Joshua Ekandem, Beaverton, OR (US); Kathy Yuen, Portland, OR (US); Giuseppe Raffa, Portland, OR (US); John C. Weast, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/605,961

(22) Filed: May 26, 2017

(65) Prior Publication Data
US 2017/0265051 A1    Sep. 14, 2017

Related U.S. Application Data

(62) Division of application No. 14/669,788, filed on Mar. 26, 2015, now Pat. No. 9,705,547.

(51) Int. Cl.
*H04M 1/00* (2006.01)
*H04W 4/90* (2018.01)
(Continued)

(52) U.S. Cl.
CPC ............ *H04W 4/90* (2018.02); *H04W 4/006* (2013.01); *H04W 4/22* (2013.01); *H04W 4/38* (2018.02);
(Continued)

(58) Field of Classification Search
CPC ....... H04B 1/385; H04W 4/008; H04W 4/021
See application file for complete search history.

(56) References Cited

U.S. PATENT DOCUMENTS 7,113,106 B2      9/2006   Sendrowicz
9,153,135 B2 *   10/2015   Bantz ............... G08G 1/096741
(Continued)

OTHER PUBLICATIONS

Non-Final Office Action dated Oct. 12, 2016, issued in related U.S. Appl. No. 14/669,788, 15 pages.
(Continued)

*Primary Examiner* — Tuan Pham
(74) *Attorney, Agent, or Firm* — Schwabe, Williamson & Wyatt, P.C.

(57) ABSTRACT

One or more sensors gather data, one or more processors analyze the data, and one or more indicators notify a user if the data represent an event that requires a response. One or more of the sensors and/or the indicators is a wearable device for wireless communication. Optionally, other components may be vehicle-mounted or deployed on-site. The components form an ad-hoc network enabling users to keep track of each other in challenging environments where traditional communication may be impossible, unreliable, or inadvisable. The sensors, processors, and indicators may be linked and activated manually or they may be linked and activated automatically when they come within a threshold proximity or when a user does a triggering action, such as exiting a vehicle. The processors distinguish extremely urgent events requiring an immediate response from less-urgent events that can wait longer for response, routing and timing the responses accordingly.

18 Claims, 7 Drawing Sheets

(51) Int. Cl.
    *H04W 4/22*     (2009.01)
    *H04W 64/00*     (2009.01)
    *H04W 4/00*     (2018.01)
    *H04W 4/38*     (2018.01)
    *G08B 25/01*     (2006.01)
    *H04W 4/02*     (2018.01)
    *H04W 76/00*     (2018.01)
    *H04W 76/50*     (2018.01)

(52) U.S. Cl.
    CPC ......... *H04W 64/006* (2013.01); *G08B 25/016* (2013.01); *H04W 4/025* (2013.01); *H04W 76/007* (2013.01); *H04W 76/50* (2018.02)

(56) References Cited

U.S. PATENT DOCUMENTS

| | | |
|---|---|---|
| 2007/0103292 A1 | 5/2007 | Burkley et al. |
| 2008/0122736 A1 | 5/2008 | Ronzani et al. |
| 2009/0069642 A1 | 3/2009 | Gao et al. |
| 2010/0088378 A1 | 4/2010 | Asawa et al. |
| 2010/0315228 A1 | 12/2010 | Grilliot et al. |
| 2012/0242477 A1 | 9/2012 | Rosenblatt |
| 2014/0049417 A1 | 2/2014 | Abdurrahman et al. |
| 2014/0203938 A1 | 7/2014 | McLoughlin et al. |
| 2014/0268601 A1 | 9/2014 | Valentino et al. |
| 2014/0276227 A1 | 9/2014 | Perez |
| 2016/0203685 A1 | 7/2016 | Schwartz |

OTHER PUBLICATIONS

Notice of Allowance dated May 1, 2017, issued in related U.S. Appl. No. 14/669,788, 8 pages.

International Search Report & Written Opinion dated Jun. 3, 2016, issued in related International Application No. PCT/US16/22240, 10 pages.

International Preliminary Report on Patentability dated Oct. 5, 2017, issued in related International Application No. PCT/US16/22240, 9 pages.

\* cited by examiner

FIG. 6A  FIG. 6B

AD-HOC WIRELESS COMMUNICATION NETWORK INCLUDING WEARABLE INPUT/OUTPUT TRANSDUCERS

RELATED APPLICATIONS

This application claims the benefit of priority from U.S. Non-Prov. patent application Ser. No. 14/669,788 filed 26 Mar. 2015 which is entirely incorporated by reference herein.

FEDERALLY SPONSORED RESEARCH AND DEVELOPMENT

None

APPENDICES

None

FIELD

Related fields include wearable electronics, and more particularly the formation of temporary ad-hoc communication networks including wearable electronics.

Figure 1:
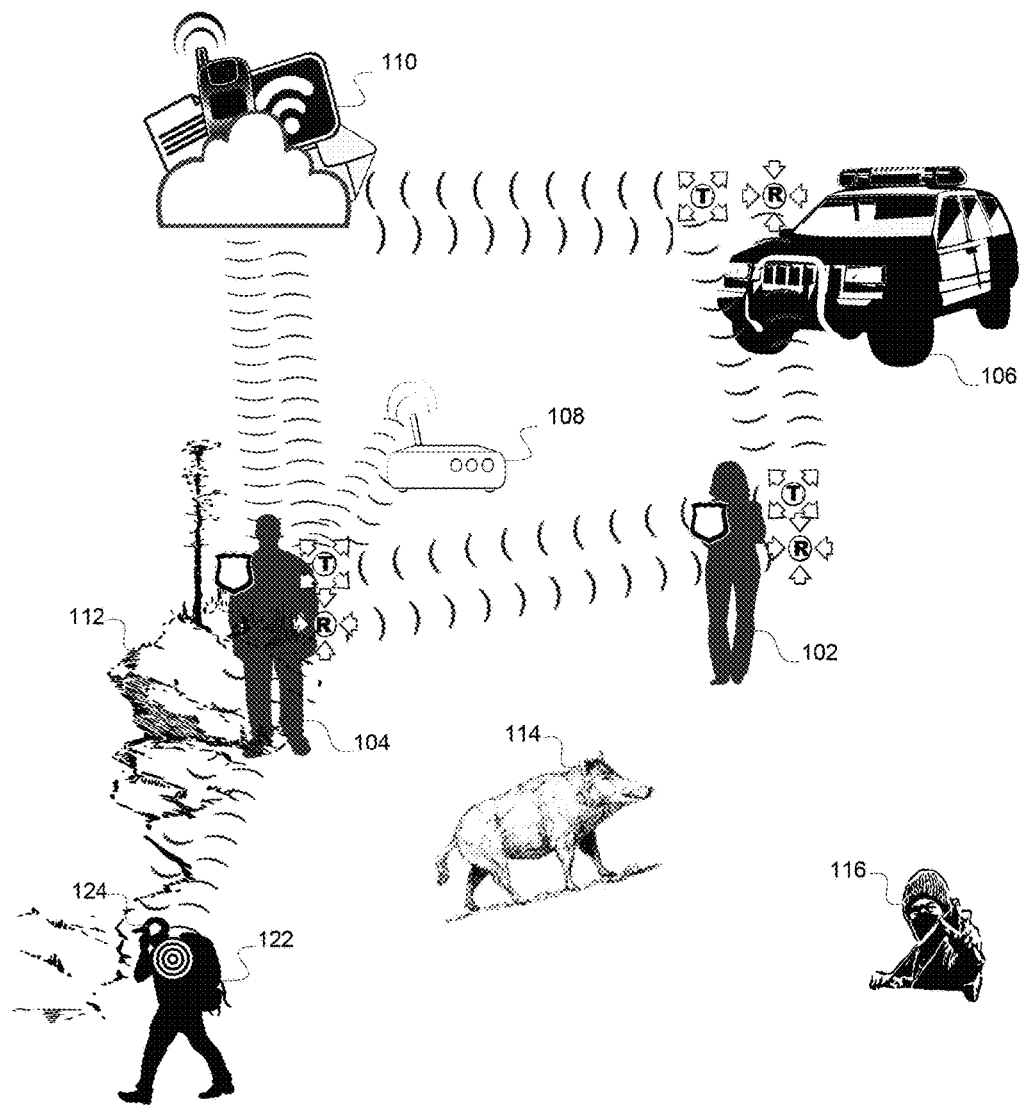
FIG. 1 is a conceptual map of an example of an ad-hoc network.

The main components are sensors (input transducers), indicators (output transducers), and an intelligent agent that may include hardware, software, or both in a processor or in a group of distributed processors. The intelligent agent analyzes the sensor inputs, classifies them according to urgency and need for outside data, decides which indicators need to respond to the sensor inputs and how the signals are to be routed.

"Sensors" is used here is a generic term for all the input transducers transmitting signals to one or more processors. Sensors include cameras and microphones as well as biometric and environmental sensors. On-body sensors 202 include wearables (clothing 212 and mounted directly to the body with adhesive 232), hand-held or carried in backpacks or pockets while operating (accessories 222). Off-body sensors 204 may include anything not worn or carried by a user while operating. Off-body sensors may include sensors mounted on a vehicle 214, on equipment are tools not carried during operation 224, or in some embodiments the sensors worn or carried by another user 234.

In some embodiments, the incoming information from all the sensors is synchronized in step 242 and recorded to storage in step 244. The recordings may be transmitted in real-time to a server, or they may be stored for later upload.

The incoming information for all the sensors also goes to the intelligent agent 252, and may be synchronized or not depending on the embodiment. In the intelligent agent 252, a signal recognition engine 254 compares the incoming signals with examples of predicted signals stored in an event/response database 258. If a match is found, intelligent agent 252 infers that the corresponding event has happened. Some embodiments may cross-check numerous sensors to prevent "false alarm" inferences. To formulate a response to the inferred event, the intelligent agent may use data from teammate/contact database 256, which may use the location and type of inferred event, sometimes along with the identity of the user originate in the sensor signals, to decide who needs to be notified of the inferred event; partners, supervisors, medics, etc.

A procedural template database 262 may be included as a reference for any strict, complex, or frequently changed procedures that users must follow even in a chaotic environment, such as clean forensic practices, chain-of-custody handling of evidence, or emergency first aid for specialized situations. Some embodiments of the intelligent agent 252 may make use of other internal databases 264; for example, if the users are SCUBA divers, there may be an internal database 264 to calculate how much longer each diver may stay submerged and what kind of decompression stop, if any, is needed. In some embodiments, the intelligent agent may dry information from external or remote databases 272, such as facial and voice recognition databases and criminal record databases.

If the signal recognition engine 254 infers an event that needs an immediate response, the prescribed command from event/response database 258 is sent directly over the local ad-hoc network to the prescribed indicator. The indicators may be visual, such as LEDs or the screens of smart watches or heads-up displays; audible, from variable tones to recorded instructions (e.g., from procedural template database 262); or tactile, such as haptic transducers. Like the sensors, there may be a group of on-body indicators 206 on clothing 216, accessories 226, or attached to the body by adhesive 236. There may also be a group of off-body indicators 208 mounted on or in a vehicle 218, tools are equipment 228, or someone else's body 238. In some embodiments, the intelligent agent may use location sensors to determine whether any of the users are close enough to make use of an off-body indicator.

Figure 3:
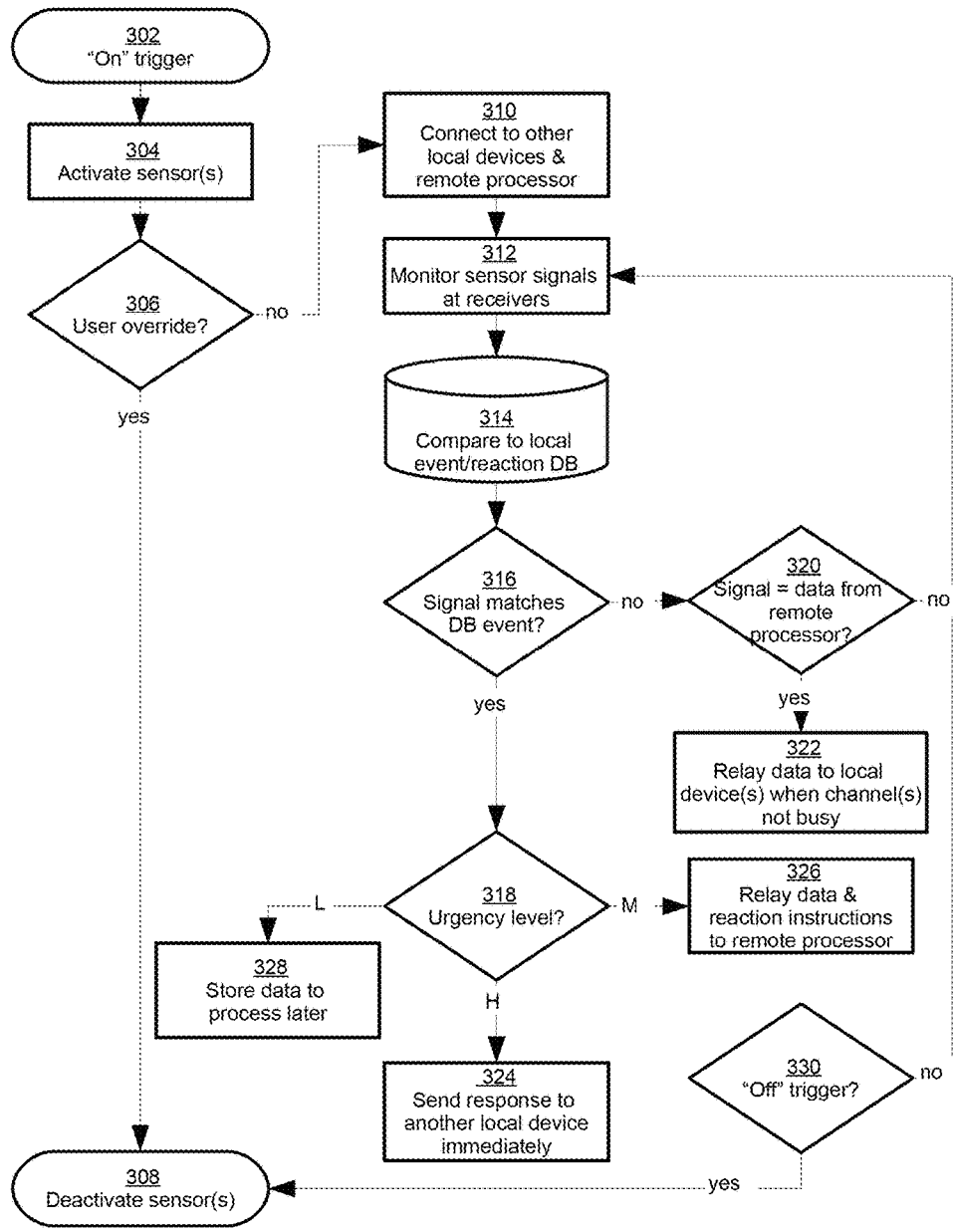

FIG. 3 is a flowchart of data handling by a processor connected to an ad-hoc network.

Figure 4A:
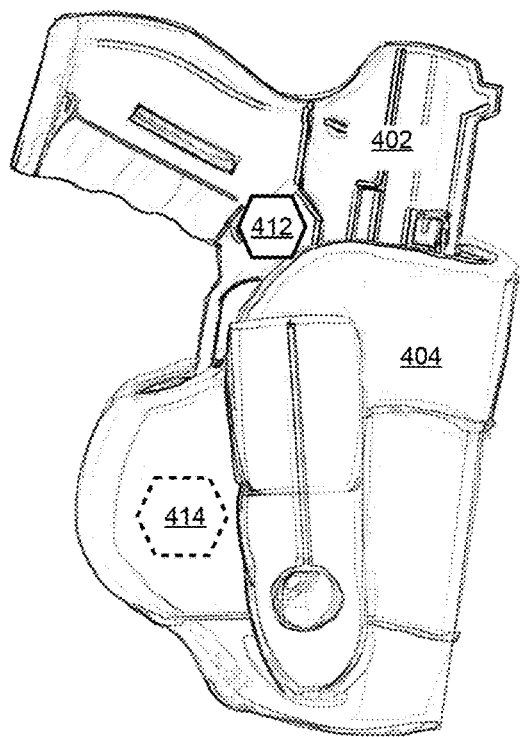
Figure 4B:
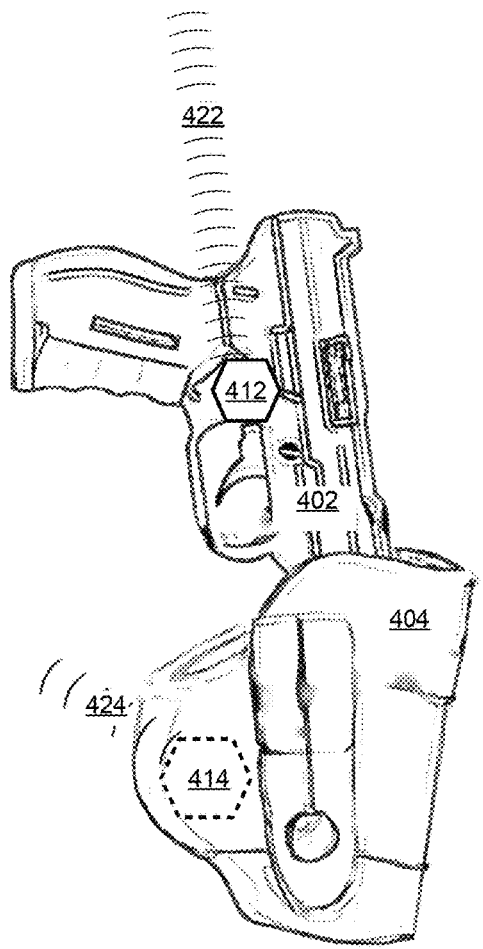

FIGS. 4A-B illustrate an example of a holster interlock sensor for an ad-hoc network of armed professionals.

FIGS. 5A-K illustrate examples of wearable articles incorporating sensors or indicators.

FIGS. 6A-D illustrate an example of an ad-hoc network for police work.

Figure 7:
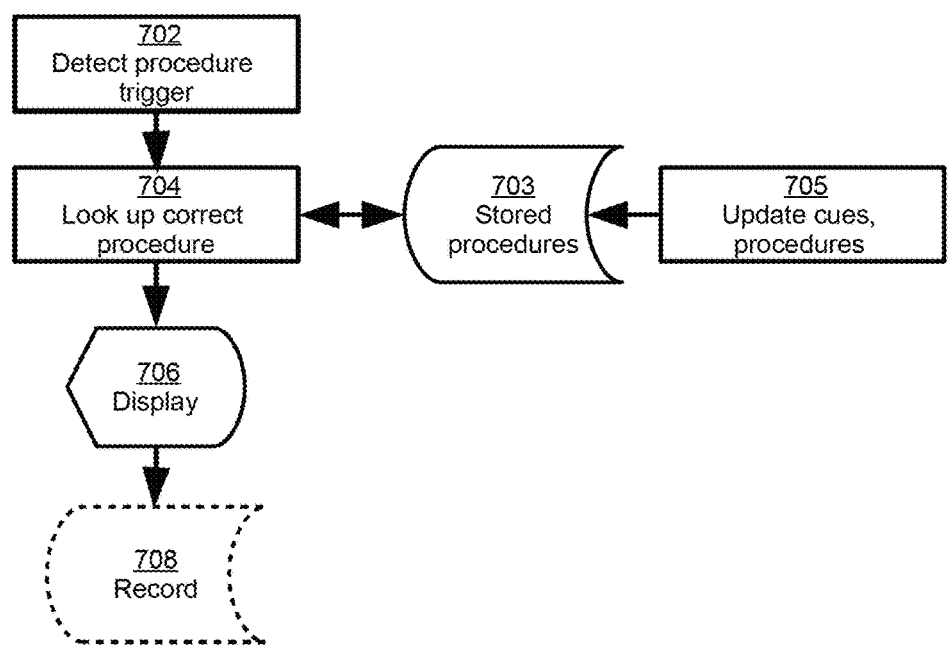

FIG. 7 is a flowchart of an example of a procedural-guidance function.

DETAILED DESCRIPTION

A team of workers performing a hazardous, unpredictable task can mitigate some of the risk by leveraging "safety in numbers," coming to the aid of any teammate that finds himself or herself in trouble. Being able to help hinges on knowing what and where the trouble is as soon as it starts. This can be difficult if the teammates are too far apart to see or hear each other and normal communications (e.g., walkie-talkies, earbuds, cell phones, speaking and listening hardware built into protective gear) are not working. The area may be too noisy, or it may lack a repeater or other necessary infrastructure. The trouble may be of a kind that prevents the victim from communicating clearly: being overcome by toxic fumes, falling from a crumbling cliff-edge, or being ambushed by enemy combatants. Therefore, a need exists for a way to monitor teammates' situations in real time without needing to converse over a conventional channel. Such a solution could be applied to war, anti-terrorist action, police and security work, firefighting, toxic-waste cleanup, disaster relief, search and rescue, and similar activities.

An ad-hoc network including wearable electronics worn on users' bodies, and optionally including other components mounted on vehicles or temporarily set up at the task site, alerts other on-site (and optionally off-site) users when any user appears to need backup. For example, one or more wearable accelerometers may detect when the wearer falls or begins running. Wearable heart rate (HR) or galvanic skin response (GSR) sensors may detect surprise, strong emotion, or the onset of exhaustion. Wearable temperature and humidity sensors may warn when exposure to the environment becomes dangerous. Weapon holster interlocks may inform other users when any user draws a weapon. Microphones can produce audio data for voice stress analysis and voice recognition of users and other people that the users encounter, or sounds characteristic of environmental hazards such as flash floods or rockfall. Cameras may collect data for facial recognition or monitor activity in users' blind spots. If input from multiple sensors is aggregated, synchronized using time-stamps, and recorded, a multi-perspective record of events can be produced.

FIG. 1 is a conceptual map of an example of an ad-hoc network. Police officers 102 and 104 are looking for missing hiker 122. At the trailhead, they park their vehicle 106 and set off on foot. Each of the officers 102 and 104 has a wearable electronics with capabilities including transmission T and reception R. Transmission T and reception R may use any suitable communication protocol.

Vehicle 106 as capabilities that also include transmission T and reception R; either or both officers 102 and 104 may communicate with the vehicle at any time. This expands the officers' capabilities while keeping their wearables simple, rugged, and lightweight with low power consumption, extending battery life and increasing the usefulness of portable chargers such as solar and hand-cranked chargers. For example, vehicle 106 may be able to relay messages from officers 102 and 104 to their dispatcher or to other police or park rangers in the area. The vehicle 106 may contain processors and on-board databases or links to databases in cloud 110.

Optionally, a communication hub may be brought to the site, or an existing on-site communication hub may be redeployed as part of the a-hoc network. For example, a portable signal booster 108 may be carried in and set up if some feature of the terrain, such as the crest of a hill, attenuates communication between the officers 102, 104 and/or the vehicle. In rescue or emergency communication situations where target 122 wants to be found, portable signal booster 108 may enable officers 102, 104 to reach the mobile phone 124 of target 122, or scan for a locator chip in mobile phone 124, where previously the signals were too weak because the nearest cellular towers were too far away. Portable signal booster 108 may also enable the officers' wearables to communicate with servers in cloud 110 directly.

Officers 102 and 104 may split up to cover more area, knowing that if they encounter threats such as unfriendly animal 114 or human fugitive 116, their partner will be notified instantly. In some embodiments, the officers need not be able to give accurate directions or even to speak, because their wearable transmitters may react to the readings of stress-level sensors and motion sensors by transmitting a distress signal after such triggers as a rapid increase in heart rate, a rapid increase in perspiration, or beginning to run, jump, or fall. Their wearable receivers' output may include a distance to the source of the distress signal, a direction from which the stress signal is coming, and the strength of the distressed person's reaction.

Embodiments of processors in the vehicle 106, the portable signal booster 108, and in some embodiments integrated with the wearables of officers 102, 104, may distinguish urgent messages from non-urgent received messages, or messages that require the use of a database from those that do not, and route them differently as appropriate. Distress signals and other urgent messages may be immediately circulated through the local ad-hoc network formed between the officers' wearables and optionally including one or more on-site vehicles and one or more deployed portable signal boosters. Such messages may simultaneously be sent to a dispatcher or to other officers in the area. Non-urgent messages may be sent to one or more cloud servers for retransmission with or without further processing. Optionally, the processor may record all the incoming signals from the officers' wearable and other equipment to thoroughly document the operation. Such recordings may be archived on the fly or after the officers' return.

As well as in search-and-rescue operations, the usefulness of these ad-hoc networks with wearables is readily adaptable to firefighting, criminal apprehension, warfare, disaster relief, mountain or cave exploration, undersea diving, inhabitat study of dangerous animals, and other activities where teams of users may face unpredictable hazards while not remaining visible to each other, where conventional communication may be difficult, or we're hazards may emerge too quickly to rely on conventional communications.

Figure 2:
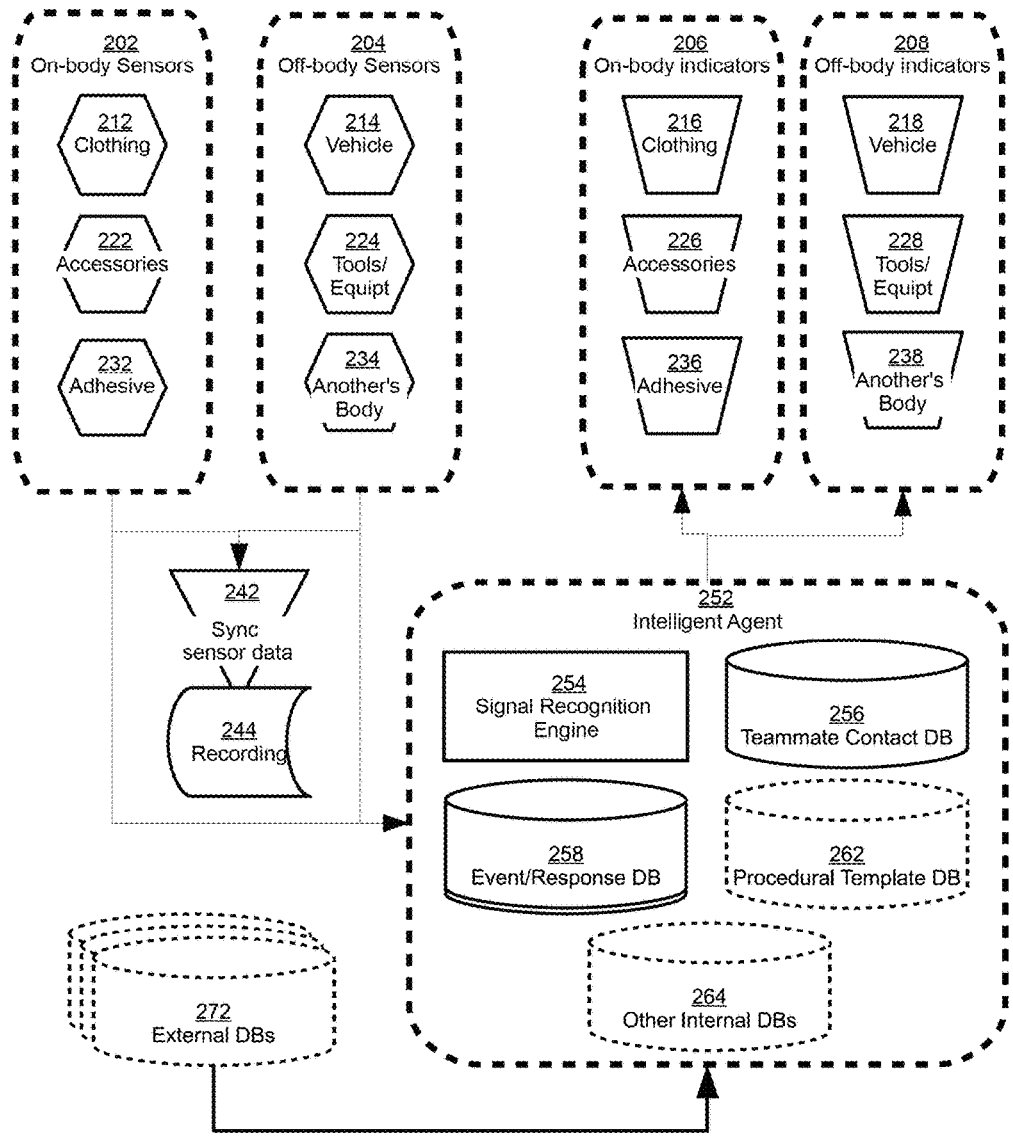
FIG. 2 is a block diagram of an example of an ad-hoc network.

FIG. 2 is a block diagram of an example of an ad-hoc network. The main components are sensors (input transducers), indicators (output transducers), and an intelligent agent that may include hardware, software, or both in a processor or in a group of distributed processors. The intelligent agent analyzes the sensor inputs, classifies them according to urgency and need for outside data, decides which indicators need to respond to the sensor inputs and how the signals are to be routed. In embodiments, a non-transitory machine-readable information storage medium may contain code that, when executed, causes a machine to perform actions that may include to analyze a received signal. In embodiments, if the received signal is a sensor reading, the machine may be caused to compare the sensor reading to a database of stored sensor readings and corresponding responses and to evaluate an urgency associated with the response, and wherein upon finding a match to the sensor reading in the database, to transmit the associated response over a local network if the urgency exceeds a threshold or over a conventional network if the urgency does not exceed the threshold.

"Sensors" is used here is a generic term for all the input transducers transmitting signals to one or more processors. Sensors include cameras and microphones as well as biometric and environmental sensors. On-body sensors 202 include wearables (clothing 212 and mounted directly to the body with adhesive 232), hand-held or carried in backpacks or pockets while operating (accessories 222). Off-body sensors 204 may include anything not worn or carried by a user while operating. Off-body sensors may include sensors mounted on a vehicle 214, on equipment are tools not carried during operation 224, or in some embodiments the sensors worn or carried by another user 234.

In some embodiments, the incoming information from all the sensors is synchronized in step 242 and recorded to storage in step 244. The recordings may be transmitted in real-time to a server, or they may be stored for later upload.

The incoming information for all the sensors also goes to the intelligent agent 252, and may be synchronized or not depending on the embodiment. In the intelligent agent 252, a signal recognition engine 254 compares the incoming signals with examples of predicted signals stored in an event/response database 258. If a match is found, intelligent agent 252 infers that the corresponding event has happened. Some embodiments may cross-check numerous sensors to prevent "false alarm" inferences. To formulate a response to the inferred event, the intelligent agent may use data from teammate/contact database 256, which may use the location and type of inferred event, sometimes along with the identity of the user originate in the sensor signals, to decide who needs to be notified of the inferred event; partners, supervisors, medics, etc.

A procedural template database 262 may be included as a reference for any strict, complex, or frequently changed procedures that users must follow even in a chaotic environment, such as clean forensic practices, chain-of-custody handling of evidence, or emergency first aid for specialized situations. Some embodiments of the intelligent agent 252 may make use of other internal databases 264; for example, if the users are SCUBA divers, there may be an internal database 264 to calculate how much longer each diver may stay submerged and what kind of decompression stop, if any, is needed. In some embodiments, the intelligent agent may dry information from external or remote databases 272, such as facial and voice recognition databases and criminal record databases. Accordingly, the various databases described above may include a memory such as including a machine-readable information storage medium to store the various types of information as described above.

If the signal recognition engine 254 infers an event that needs an immediate response, the prescribed command from event/response database 258 is sent directly over the local ad-hoc network to the prescribed indicator. The indicators may be visual, such as LEDs or the screens of smart watches or heads-up displays; audible, from variable tones to recorded instructions (e.g., from procedural template database 262); or tactile, such as haptic transducers. Like the sensors, there may be a group of on-body indicators 206 on clothing 216, accessories 226, or attached to the body by adhesive 236. There may also be a group of off-body indicators 208 mounted on or in a vehicle 218, tools are equipment 228, or someone else's body 238. In some embodiments, the intelligent agent may use location sensors to determine whether any of the users are close enough to make use of an off-body indicator.

FIG. 3 is a flowchart of data handling by a processor connected to an ad-hoc network. The "on" trigger 302 that starts the system may be manual and user-operated, or maybe triggered by some action that indicates that the user is joining an ad-hoc network. For example, a police vehicle could have an infrared path across the doorway, similar to the obstacle detector that keeps an automatic door from closing if something is in the path. Whenever the police officer left the vehicle, e.g., for a traffic stop, crossing the infrared beam would automatically turn on the officer's wearable system and the vehicle system as step 304. Alternatively, a proximity sensor in the vehicle could turn on the systems for step 304 when the officer's body moves out of a certain range.

Some embodiments with automatic "on" triggers 302 may provide for user override 306, which triggers sensor deactivation 308. For example, if a police officer leaves the vehicle to work on reports at the station or take a lunch break, it is highly unlikely that the ad-hoc network will be needed; nor will 2 hours of recorded typing be worth the data storage space it occupies.

If the sensors are activated and there is no user override, the user's wearable electronics connect to other local devices, any local processors, and optionally to a remote processor in step 310. The processors commence monitoring the received sensor signals in step 312. The signals are compared to entries in the local event/reaction database 314 and if a match is found at decision 316, the urgency level is evaluated at decision 318. For example, even if the sensors a single microphone, the intelligent agent may analyze the amount of voice stress and infer a degree of urgency from the result. The lowest urgency events may simply be stored to processor later time in step 328. The highest urgency events will immediately activate a local indicator through the ad-hoc network, "jumping the queue" to precede or even interrupt less-urgent signals. Events of medium urgency (including high-urgency events that have already been broadcast over the ad-hoc network, and requests that involve querying one or more off-site databases) are relayed to a remote processor, e.g., a cloud-based processor, for processing: consulting the database, contacting dispatchers or other nearby officers, or other tasks that present no risks by being sent to the remote processor.

Not all signals that come two decisions 316 will match events in the event/response database. Some signals may be data transmitted from a remote processor in step 320, including answers to medium-urgency queries. Those signals are relayed to the local indicators in the ad-hoc network whenever the system is not occupied by higher-urgency signals. If the signal does not match inferred event and is not data coming from a remote processor, the intelligent agents ignores it and continues to monitor the sensor signals, in effect looking back to step 312. At any time, there may be an "off" trigger at decision 330 deactivating the system to save power when the ad-hoc network is not needed. Like the "on" trigger, the "off" trigger may be manual or automatic.

FIGS. 4A-B illustrate an example of a holster interlock sensor for an ad-hoc network of armed professionals. When a soldier, police officer, or other security specialist draws a weapon during an operation, it almost always signifies an emergency need for backup. If removing a weapon from a holster automatically sends a high-urgency signal over an ad-hoc network, the user's allies in the area will be alerted immediately, even if the user is out of their sight or the environment is too noisy to hear what the user is saying. In some embodiments, removing the weapon from a holster may activate a wearable camera (e.g., mounted on a cap or near the neckline of a body-armor vest) to record what the user is seeing and/or a microphone to record what the user hears and says. This an example of sensors temporarily acting as indicators when they are turned on in response to signals from other sensors.

In FIG. 4A, handgun 402 is secured in holster 404. There may be a proximity sensor 414 in holster 404, an accelerometer 412 on handgun 402, or both to provide redundancy and reduce the incidence of false alarms. In FIG. 4B, when handgun 402 is removed from holster 404, accelerometer 412 senses the motion and sends a first signal 422 over the ad-hoc network. In addition, proximity sensor 414 in holster 404 stops sensing handgun 402 nearby and sends a second signal 424 over the ad-hoc network.

Although a handgun is the illustrated example, similar sensors could be mounted to nightsticks, stun guns, Tasers (TM), pepper-spray canisters, or other hand-held weapons.

FIGS. 5A-K illustrate examples of wearable articles incorporating sensors or indicators. Some may have both sensors 502 and indicators 504, or multiple sensor or indicator units. For example, an article that encircles some part of the body such as a watchband, hatband, glove, collar, shoe, or belt may hold a ring of haptic transducers indicating a direction to travel by activating the transducer facing that direction.

Figure 5A:
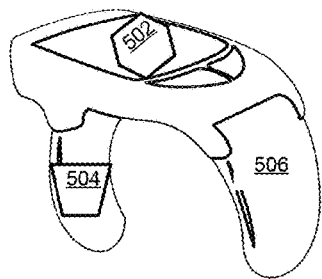
Figure 5B:
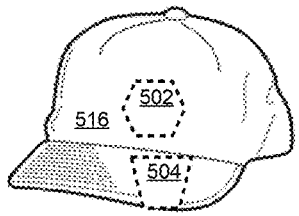
Figure 5C:
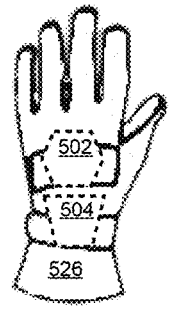
Figure 5D:
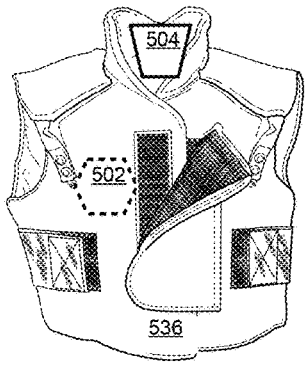

In FIG. 5A, sensors 502 and/or indicators 504 may be mounted on the band, bezel, or strap of smart-watch 506. In FIG. 5B, sensors 502 and/or indicators 504 may be mounted on the brim or crown of cap 516. In FIG. 5C, sensors 502 and/or indicators 504 may be mounted on the outside or inside of glove 526. In FIG. 5D, sensors 502 and/or indicators 504 may be mounted on the outside or inside of body-armor 536.

Figure 5E:
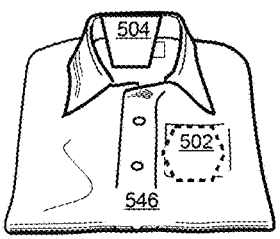
Figure 5F:
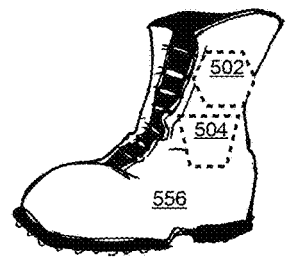
Figure 5G:
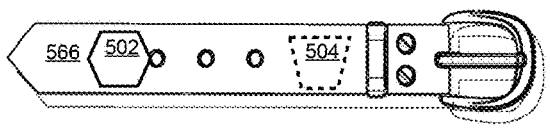
Figure 5H:
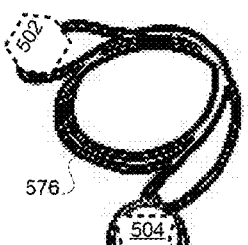

In FIG. 5E, sensors 502 and/or indicators 504 may be mounted on the outside or inside of work shirt 546. In FIG. 5F, sensors 502 and/or indicators 504 may be mounted on the upper of work boot 556. In FIG. 5G, sensors 502 and/or indicators 504 may be mounted on the strap or buckle of belt 566. In FIG. 5H, sensors 502 and/or indicators 504 may be mounted on the pendant, cord, or clasp of lanyard 576.

Figure 5I:
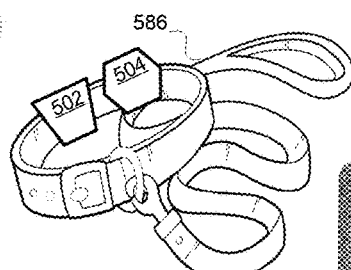
Figure 5J:
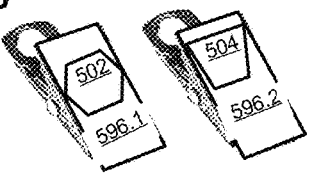
Figure 5K:
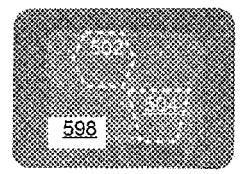

In FIG. 5I, sensors 502 and/or indicators 504 may be mounted on the outside or inside of service-animal collar 586. In FIG. 5J, sensors 502 and/or indicators 504 may be mounted on the inward- or outward-facing services of a removable clip 596.1 and 596.2. In FIG. 5K, sensors 502 and/or indicators 504 may be mounted on a removable adhesive patch 598 to be worn temporarily on the surface of the skin. The adhesive embodiment may be convenient for sensors such as galvanic skin response (GSR) that need to maintain contact with the skin on a user in vigorous or nearly constant motion.

Figure 6C:
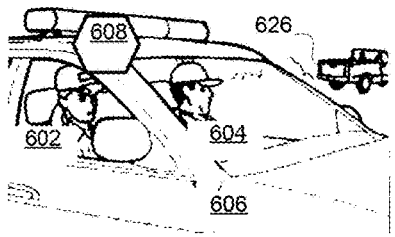
Figure 6C:
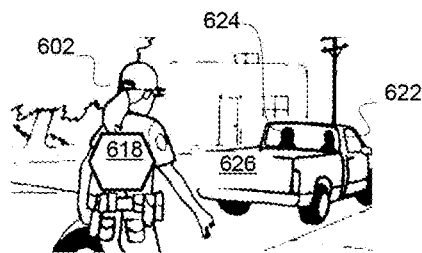
Figure 6C:
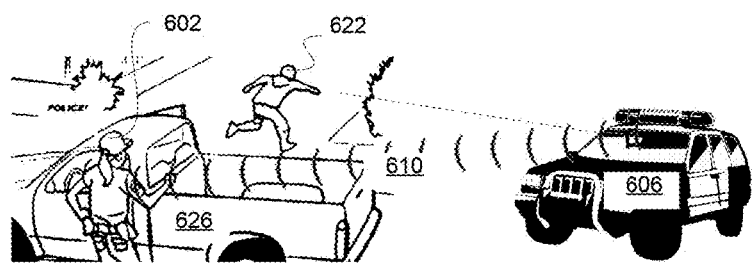

FIGS. 6A-D illustrate an example of an ad-hoc network for police work. In FIG. 6A, police officer 602 and partner 604 are patrolling in a vehicle 606 with an automatic on-trigger 608 for the officers' wearable electronics. In FIG. 6B, the officers have detained a suspect vehicle 626 carrying a driver 624 and a passenger 622. Officer 602 has exited from vehicle 606, automatically activating her wearable location sensor 618.

In FIG. 6C, officer 602 comes to the driver's window of suspect vehicle 626 to speak to the driver. In officer 602's blind spot, passenger 622 leaves vehicle 626 at a run. Although officer 602 may not have seen it, a camera on police vehicle 606 had an excellent view. The intelligent agent reading the camera signal recognizes the event of the passenger leaving a detained vehicle and immediately send signal 610 over the ad-hoc network to or more of officer 602's wearable indicators. For example, a warning LED under the brim of the officer's cap may illuminate; a haptic transducer on the officer's belt facing the direction of the fleeing passenger may buzz; or a heads-up display built into the officers' eyewear may give more detailed information.

Figure 6D:

In FIG. 6D, the timely-alerted officer 602 chases the suspect passenger 622. The ad-hoc network stretches to wherever officer 602 goes. Her location sensor 618 allows her partner or other backup to join the chase from another direction, and biometric sensors 628 monitor her levels of stress and exertion as urgency indicators.

FIG. 7 is a flowchart of an example of a procedural-guidance function. Procedural steps can be difficult to remember if the procedure is new, or new to the person executing it; if the procedure is complex, seldom used, or has recently changed. Nevertheless, much can be put at risk by skipping a step of a procedure or doing it wrong. Evidence, or entire cases, may be thrown out of court. A patient may die or be permanently injured. A piece of military machinery may malfunction in battle. Therefore, a need exists to more reliably ensure that procedures are done correctly.

Ad-hoc networks including wearable sensors and/or indicators that enable prompts for the various stages of a procedure as is being performed. At step 702, a sensor detects a procedure trigger. For example, a microphone may receive a police officer's voice saying the words "You're under arrest." The intelligent agent infers the event of a suspect being arrested. In step 704, it searches the procedure database (or other data-store) 703 for arrest procedures and retrieves the latest (for example including Miranda warnings). Periodically, step 705 updates the stored procedures. In step 706, the steps of the procedure are visually displayed (or may be audibly recited) to the user executing the procedure. In some embodiments, the sensors look or listen for cues that a step has been performed (for example, by analyzing a filled-out form through a camera. Optionally, the execution of the procedure may be recorded to storage in step 708.

The preceding Description and accompanying Drawings describe examples of embodiments in some detail to aid understanding. However, the scope of the claims may also include equivalents, permutations, and combinations that are not explicitly described herein.

We claim:

1. A non-transitory machine-readable information storage medium containing code that, when executed, causes a machine to perform actions, the actions comprising:
    to analyze a received signal;
    if the received signal is a sensor reading, to compare the sensor reading to a database of stored sensor readings and corresponding responses and to evaluate an urgency associated with the response;
    after comparison of the sensor reading to the stored sensor readings in the database, to transmit an associated response over a local ad-hoc network if the urgency is associated with a first urgency level and to transmit the associated response to a remote processor for retransmission over a remote network if the urgency is associated with a second urgency level.

2. The non-transitory machine-readable information storage medium of claim 1, wherein the first and the second urgency levels include at least one of a low, medium, or high urgency level.

3. The non-transitory machine-readable information storage medium of claim 1, wherein the actions further comprise, prior to perform the action of to transmit the associated response to the local ad-hoc network or to the remote processor, to classify the sensor reading according to a need for external data and wherein the remote network includes a cloud-based network.

4. The non-transitory machine-readable information storage medium of claim 3, wherein if the sensor reading is classified according to a need for external data, the machine is caused to transmit the associated response to the remote processor.

5. The non-transitory machine-readable information storage medium of claim 1, wherein if the machine is caused to transmit the associated response over the local ad-hoc network, the machine transmits the associated response to an ad-hoc network of wearable electronics worn on users' bodies.

6. The non-transitory machine-readable information storage medium of claim 1, wherein the machine is caused to further perform actions comprising determining whether a visual or audio indicator on a user's body is to respond to a sensor input associated with the sensor reading.

7. The non-transitory machine-readable information storage medium of claim 6, further comprising to receive an additional signal and wherein the additional signal indicates that a stage of a procedure has been performed and based on a stored procedural template, to provide a next stage of the procedure to the visual or audio indicator on the user's body.

8. A sensor apparatus for routing a response, comprising:
an input transducer;
a processor coupled to the input transducer to:
receive a signal from the input transducer; and
evaluate an urgency associated with the signal; and
a transmitter controlled by the processor to transmit an associated response over a local ad-hoc network if the urgency is associated with a first urgency level and to transmit the associated response to a cloud-based processor for retransmission over a remote network if the urgency is associated with a second urgency level.

9. The sensor apparatus of claim 8, wherein the first urgency level and the second urgency level include at least one of a low, medium, or high urgency level.

10. The sensor apparatus of claim 8, wherein the input transducer includes at least one of a camera, microphone, biometric sensor, and environmental sensor.

11. The sensor apparatus of claim 10, wherein the sensor apparatus is one of a plurality of sensor apparatuses in the local ad-hoc network and includes a network of wearable on-body electronics including at least one of a smartwatch, hatband, glove, collar, shoe, belt, clothing, eyewear, clip, and gun holster interlock sensor.

12. The sensor apparatus of claim 8, wherein the sensor apparatus is mounted in a vehicle.

13. The sensor apparatus of claim 8, wherein the processor is further to receive an additional signal from the input transducer, wherein the additional signal is a cue to indicate whether a first stage of a procedure has been performed.

14. The sensor apparatus of claim 13, wherein the transmitter is further controlled by the processor to transmit an indication to the local ad-hoc network or to a remote processor to indicate that the first stage of the procedure has been performed and the sensor apparatus is ready to receive information related to a next stage of the procedure.

15. A method, comprising:
receiving, by a signal recognition engine, a signal from a sensor;
comparing, by the signal recognition engine, the received signal with stored sensor readings in a database to evaluate an urgency associated with the received signal; and
instructing by the signal recognition engine, a transmitter to transmit an associated response over a local ad-hoc network if the urgency is associated with a first urgency level and to transmit the associated response to a remote processor for retransmission over a remote network if the urgency is associated with a second urgency level.

16. The method of claim 15, wherein the local ad-hoc network includes a network including wearable on-body electronic sensors and off-body electronic sensors.

17. The method of claim 15, wherein the remote network includes a cellular network, dispatch network, or other cloud-based network.

18. The method of claim 15, wherein retransmission over the remote network includes transmission to a location including a procedural template database for formulation of an additional response to the received signal.

* * * * *